(12) United States Patent
Lee et al.

(10) Patent No.: US 8,372,297 B2
(45) Date of Patent: Feb. 12, 2013

(54) METHOD FOR FABRICATING MEMBRANE HAVING HYDROPHILICITY AND HYDROPHOBICITY

(75) Inventors: Chang-woo Lee, Gyeongsangbuk-do (KR); Dong-seob Kim, Gyeongsangbuk-do (KR); Sun Wei, Philadelphia, PA (US); Woon-bong Hwang, Gyeongsangbuk-do (KR)

(73) Assignee: Postech Academy-Industry Foundation, Pohang (KR)

( * ) Notice: Subject to any disclaimer, the term of this patent is extended or adjusted under 35 U.S.C. 154(b) by 168 days.

(21) Appl. No.: 12/922,090

(22) PCT Filed: Mar. 12, 2009

(86) PCT No.: PCT/KR2009/001251
§ 371 (c)(1),
(2), (4) Date: Sep. 10, 2010

(87) PCT Pub. No.: WO2009/113823
PCT Pub. Date: Sep. 17, 2009

(65) Prior Publication Data
US 2011/0006036 A1    Jan. 13, 2011

(30) Foreign Application Priority Data

Mar. 14, 2008  (KR) .................. 10-2008-0024030

(51) Int. Cl.
*B44C 1/22*    (2006.01)
*C03C 15/00*   (2006.01)

(52) U.S. Cl. .................. 216/36; 216/2; 216/41; 216/56; 427/287; 427/532

(58) Field of Classification Search ................ 216/2, 41, 216/36, 56; 427/287, 532
See application file for complete search history.

(56) References Cited

U.S. PATENT DOCUMENTS

| 7,686,885 B2 * | 3/2010 | Ku et al. ........................ 117/89 |
| 2003/0207099 A1 * | 11/2003 | Gillmor et al. ............. 428/304.4 |
| 2005/0147757 A1 | 7/2005 | Roh et al. |
| 2007/0080107 A1 | 4/2007 | Yang et al. |
| 2007/0104962 A1 | 5/2007 | Laas et al. |
| 2008/0260941 A1 * | 10/2008 | Jin ............................. 427/126.4 |

FOREIGN PATENT DOCUMENTS

| CN | 1047317 A | 11/1990 |
| JP | 06083040 A | 3/1994 |

(Continued)

OTHER PUBLICATIONS

Supplementary European Search Report for Application No. 09719973.1, dated Jun. 16, 2011.

(Continued)

*Primary Examiner* — Shamim Ahmed
(74) *Attorney, Agent, or Firm* — Marshall, Gerstein & Borun LLP

(57) ABSTRACT

A method for fabricating a membrane is disclosed, to provide both hydrophilicity and hydrophobicity to predetermined positions of a surface of a single membrane. The method for fabricating a membrane includes: preparing a template with nano-scale holes formed on its outer surface; coating a polymer material on a predetermined pattern region of the outer surface of the template; attaching a hydrophilic film on the outer surface of the template; and removing the template from the hydrophilic film.

10 Claims, 7 Drawing Sheets

FOREIGN PATENT DOCUMENTS

| | | |
|---|---|---|
| JP | 09-155972 A | 6/1997 |
| JP | 2006-237312 A | 9/2006 |
| JP | 2007-007988 A | 1/2007 |
| JP | 2007238352 | 9/2007 |
| KR | 1020060052327 | 5/2006 |
| KR | 1020080004409 | 1/2008 |
| WO | WO-90/11820 A3 | 11/1990 |
| WO | WO-0202647 A1 | 1/2002 |
| WO | WO-2007140252 A1 | 12/2007 |
| WO | WO-2008/004828 A1 | 1/2008 |

OTHER PUBLICATIONS

International Search Report and Written Opinion for PCT/KR2009/001251 dated Jun. 26, 2009.

* cited by examiner (a)

(b)

METHOD FOR FABRICATING MEMBRANE HAVING HYDROPHILICITY AND HYDROPHOBICITY

TECHNICAL FIELD

The present invention relates to a method for fabricating a membrane having both hydrophilicity and hydrophobicity and, more particularly, to a method for fabricating a membrane capable of providing both hydrophilicity and hydrophobicity to set positions of a surface of a single membrane.

BACKGROUND ART

In general, the surface of a solid base material such as a metal or polymer has a specific surface energy. The specific surface energy appears as a contact angle between a liquid and a solid when the liquid contacts the solid. Here, the liquid generally refers to water or oil, etc., and water shall be representatively mentioned as the liquid hereinafter. If the contact angle is smaller than 90° a spherical water drop loses its form on the surface of the solid to wet the surface of the solid, exhibiting wettability. If, however, the contact angle is larger than 90° the spherical water drop maintains its form on the surface of the solid to easily flow by an external force rather than wet the surface of the solid, exhibiting non-wettability. For example, if a water drop falls on a lotus leaf, it does not wet the lotus leaf but flows on the surface of the lotus leaf. This phenomenon indicates non-wettability.

The value of the specific contact angle of the surface of the solid base material may change if the surface is processed to have fine protrusions and depressions (unevenness). Namely, a hydrophilic surface having a contact angle of smaller than 90° can have greater wettability through surface processing, and a hydrophobic surface having a contact angle of larger than 90° can have a greater non-wettability through surface processing.

A technique for changing the contact angle of the surface of the solid for is known, to date, as a MEMS (Micro Electro Mechanical Systems) process to which a semiconductor fabrication technique is applied. However, the MEMS process, an up-to-date technique which applies the semiconductor technique thereto by mechanical engineering, is disadvantageous in that its fabrication process is very complicated as well as incurring much fabrication cost. Namely, in order to form the protrusions and depressions of a nano-scale on the surface of the solid by using the MEMS process, operations such as oxidizing the metal surface, applying certain temperatures and certain voltages, and oxidizing and etching in a special solution are performed. The MEMS process cannot be performed in a general working environment but should be performed in a specially fabricated clean room, and machines required for the operation are high-priced equipment. Thus, the MEMS process for forming the hydrophobic surface can hardly be employed because its process is very complicated, it is not suitable for mass production, and it incurs high fabrication costs.

In addition to the MEMS process technique, there is a technique for changing the contact angle on the surface of the solid by using a chemical processing method. However, a membrane fabricated according to the chemical processing method exhibits a low bonding force with a base material and has a coating film that is easily damaged by friction. In addition, the chemical processing method makes it difficult to chemically process only a certain particular region, so it is disadvantageous in that hydrophobicity and hydrophilicity cannot be provided together or hydrophobicity cannot be provided only to a certain region.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method for fabricating a membrane having a hydrophobic surface having advantages of simplifying the process and relatively reducing costs compared with the related art. Also, the present invention provides a method for fabricating a membrane having advantages of providing hydrophobicity only to a particular region while providing the hydrophobicity and hydrophilicity together in fabricating a membrane having a hydrophobic surface.

Technical Solution

An exemplary embodiment of the present invention provides a method for fabricating a membrane, including: preparing a template with nano-scale holes formed on its outer surface; coating a polymer material on a predetermined pattern region of the outer surface of the template; attaching a hydrophilic film on the outer surface of the template; and removing the template from the hydrophilic film.

The template according to an exemplary embodiment of the present invention may include an anodized layer having the nano-scale holes formed on an outer surface of a metal substrate by anodizing the metal substrate.

The anodized layer of the template according to the exemplary embodiment of the present invention may be formed after spraying micro-scale particles onto the surface of the metal substrate to form micro-scale protrusions and depressions.

Coating the polymer material according to the exemplary embodiment of the present invention, includes coating the polymer material on the template, positioning a mask of a predetermined pattern on the polymer material, and removing the polymer material at a region other than the predetermined pattern region.

In the exemplary embodiment of the present invention, light may be irradiated to the polymer material to change a property of the polymer material at the region that is not blocked by the mask, and the polymer material may be etched to remove the polymer material at a region other than the predetermined pattern region.

In the exemplary embodiment of the present invention, coating the polymer material includes coating the polymer material on the predetermined pattern region by operating an injector that sprays the polymer material to a predetermined thickness.

In the exemplary embodiment of the present invention, the hydrophilic film may have an adhesive property to allow the polymer material coated on the template to be attached thereto.

In the exemplary embodiment of the present invention, removing the template includes removing the template through chemical etching.

In the exemplary embodiment of the present invention, removing the template includes separating the template from the hydrophilic film with the polymer material attached thereon such that the template and the hydrophilic film are directly pulled out with an external force.

In the exemplary embodiment of the present invention, a release agent may be coated on the outer surface of the template.

Advantageous Effects

The method for fabricating a membrane according to the exemplary embodiment of the present invention is advantageous in that, because the membrane can be provided with hydrophobicity on its surface without using high-priced equipment, unlike the related art MEMS process, the fabrication costs can be reduced and the process can be simplified.

The method for fabricating a membrane according to the exemplary embodiment of the present invention is advantageous in that a membrane having hydrophilicity can be provided with hydrophobicity on its surface, so the membrane can have both hydrophilicity and hydrophobicity.

In addition, the method for fabricating a membrane according to the exemplary embodiment of the present invention is advantageous in that the membrane can be provided with hydrophobicity on its surface such that only a predetermined particular region of the membrane can be provided with hydrophobicity.

MODE FOR INVENTION

The exemplary embodiments of the present invention will now be described in detail with reference to the accompanying drawings such that a skilled person in the art can easily perform the present invention. As those skilled in the art would realize, the described embodiments may be modified in various different ways, all without departing from the spirit or scope of the present invention.

In the present invention, "micro-scale" is defined as a size in the range equal to or more than 1 μm and less than 1000 μm, and "nano-scale" is defined as a size in the range equal to or more than 1 nm and less than 1000 nm.

Figure 1:
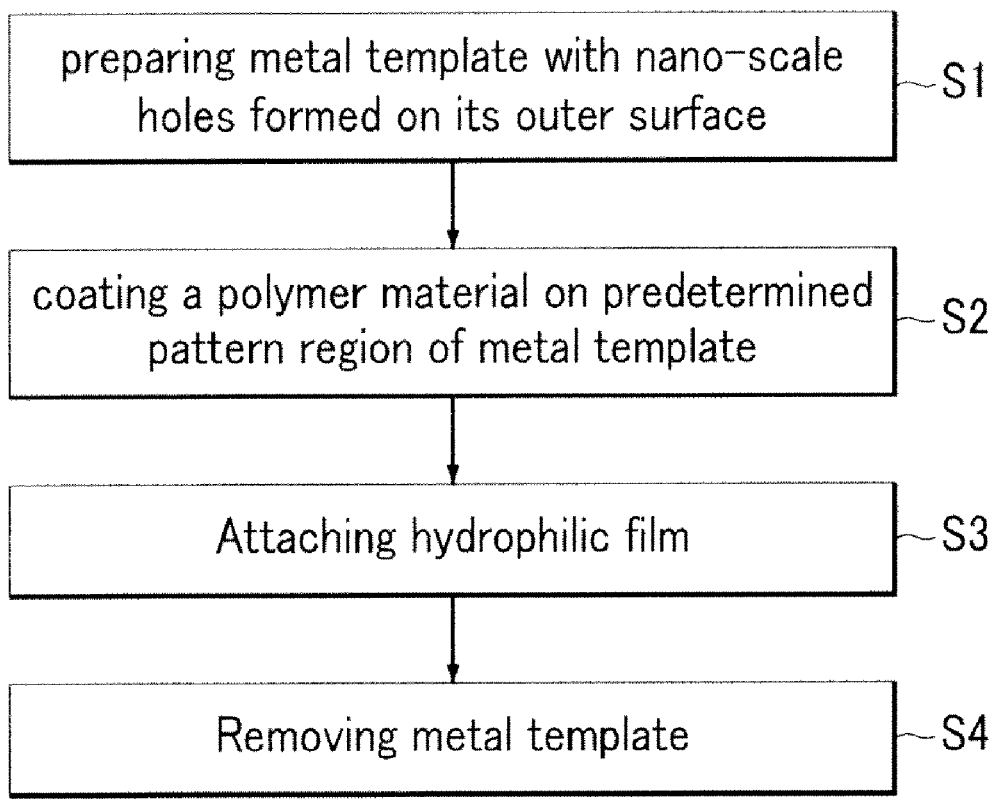
FIG. 1 is a flow chart illustrating the process of a method for fabricating a membrane having both hydrophilicity and hydrophobicity according to an exemplary embodiment of the present invention.

FIG. 1 is a flow chart illustrating the process of a method for fabricating a membrane having both hydrophilicity and hydrophobicity according to an exemplary embodiment of the present invention.

As shown in FIG. 1, the method for fabricating a membrane according to the exemplary embodiment of the present invention can fabricate a membrane having both hydrophilicity and hydrophobicity such that hydrophobicity can be provided only to a predetermined pattern region by performing the following steps.

In the exemplary embodiment of the present invention, a step S1 is performed to prepare a metal template with nano-scale holes formed on its outer surface. The metal template can be fabricated by spraying micro-scale particles to metal bases 110 and 210 as shown in FIG. 2 or anodizing them.

The metal bases 110 and 210 may not be limited to a certain particular shape of structure, but preferably have a surface larger than a predetermined area to allow a hydrophilic film to be attached thereon. For example, the metal base 110 may be a cylindrical structure as shown in (a) of FIG. 2, or may be a flat plate as shown in (b) of FIG. 2. The metal bases 110 and 210 may be made of aluminum that may be anodized or may be a structure coated with aluminum.

Figure 2:
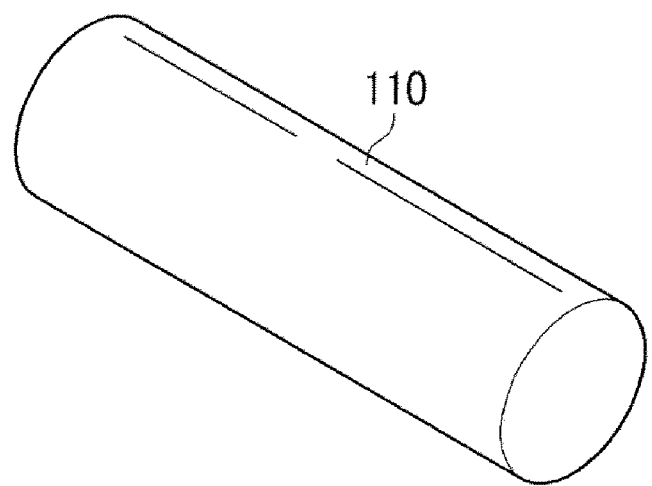
FIG. 2 shows perspective views showing metal bases used in the exemplary embodiment of the present invention.
Figure 2:
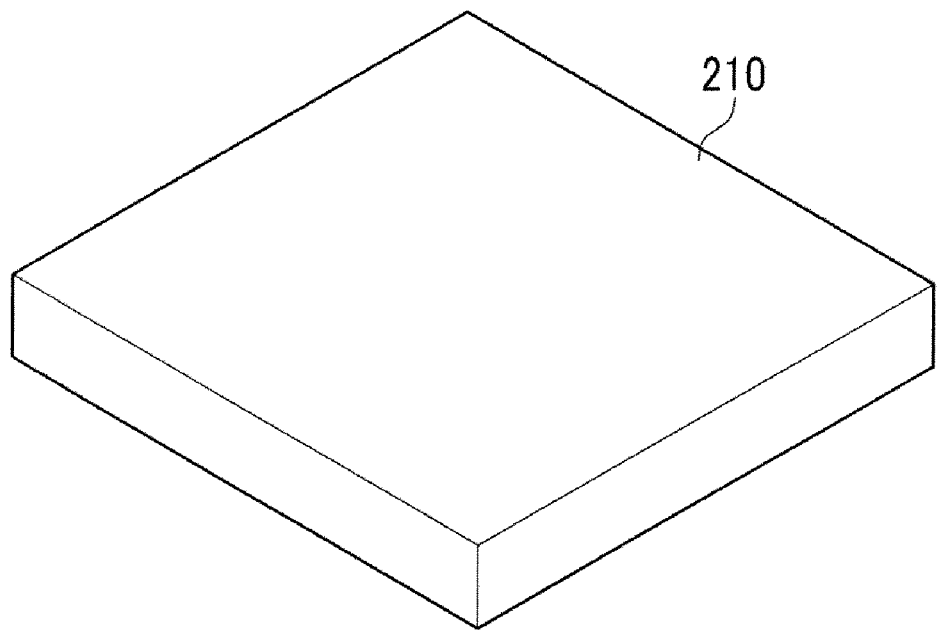
Figure 3:
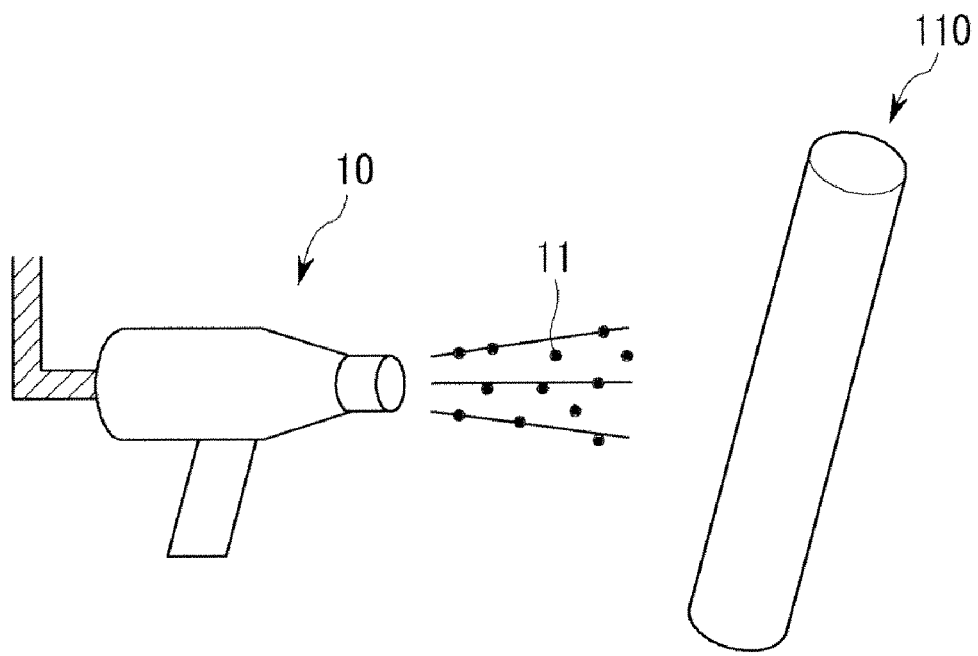
FIG. 3 is a schematic diagram showing a particle injector for forming micro-scale protrusions and depressions on the metal bases in FIG. 2.

FIG. 3 is a schematic diagram showing a particle injector for forming micro-scale protrusions and depressions on the metal bases in FIG. 2.

As shown in FIGS. 2 and 3, in the exemplary embodiment of the present invention, micro-scale protrusions and depressions are formed on the outer surface of the metal base 110 by spraying micro-scale particles 11. A particle injector 10 may be used for spraying the particles in the exemplary embodiment of the present invention. The particle injector 10 makes the micro-scale particles 10 collide with the surface of the metal base 110 at a predetermined speed and pressure. Then, as the metal base 110 is deformed by the impact energy of the micro-scale particles 11, micro-scale protrusions and depressions are formed on the outer surface of the metal base 110. The particle injector 10 used in the exemplary embodiment of the present invention may be a sand blaster for spraying sand particles, and a micro-scale particle injector for spraying micro-scale particles such as metal balls instead of sand particles may also be used. The fine protrusions and depressions of a micro-scale are formed on the outer surface of the metal base material 110 according to the operation of the particle injector 10.

Figure 4:
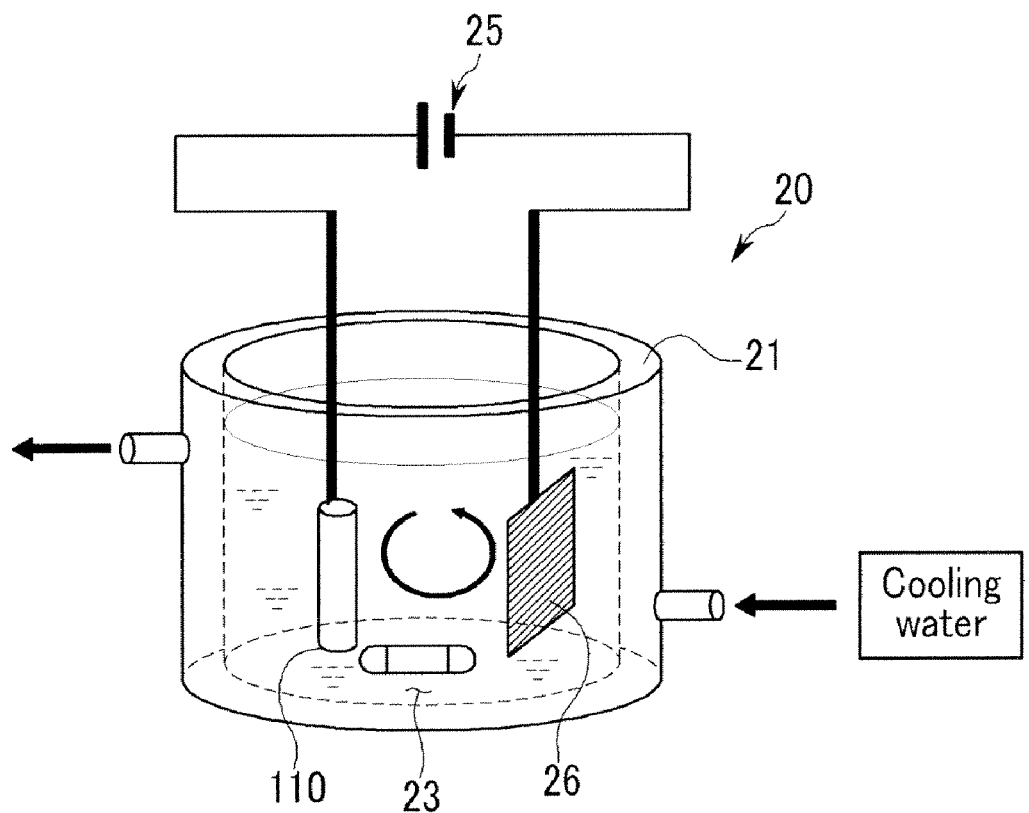
FIG. 4 is a schematic diagram showing an anodizing device for anodizing the metal bases in FIG. 2 or 3.

FIG. 4 is a schematic diagram showing an anodizing device for anodizing the metal bases in FIG. 2 or 3.

As shown in FIGS. 2, and 4, in the exemplary embodiment of the present invention, nano-scale holes are formed on the outer surface of the metal base 110 by anodizing the metal base 110. While anodizing, the metal base 110 is immersed in an electrolyte solution 23 and then electrodes are applied thereto to form an anodized layer on the surface of the metal base 110.

An anodizing device 20 as shown in FIG. 4 is used for performing anodizing in the exemplary embodiment of the present invention. In the anodizing device 20, a certain amount of the electrolyte solution 23 (e.g., 0.3M oxalic acid $C_2H_2O_4$ or phosphoric acid) is filled in an internal receiving space of a main body 21 for anodizing, in which the metal base is immersed. The anodizing device 20 includes a power supply unit 25 and the metal base material 110 is connected to one of an anode and a cathode of the power supply unit 25, and a different metal base material 26 of platinum is connected to the remaining node of the power supply unit 25. Here, the different metal base material 26 can be any material so long as it is a conductor that is available for power application. Under experimental conditions, the power supply unit 25 applies a predetermined constant voltage (e.g., 60V) to the metal base 110, and the different metal base material 26 is maintained at a predetermined distance (e.g., 50mm) therefrom. In this case, the electrolyte solution 23, which is maintained at a certain temperature, is stirred by a stirrer to prevent a local deviation of solution density. Then, alumina is formed as the anodized layer 120 on the surface of the metal base 110. After the anodizing is performed, the metal base 110 is taken out of the electrolyte solution 23, washed with deionized water, and then dried in an oven at a predetermined temperature for a certain time period.

Figure 5:
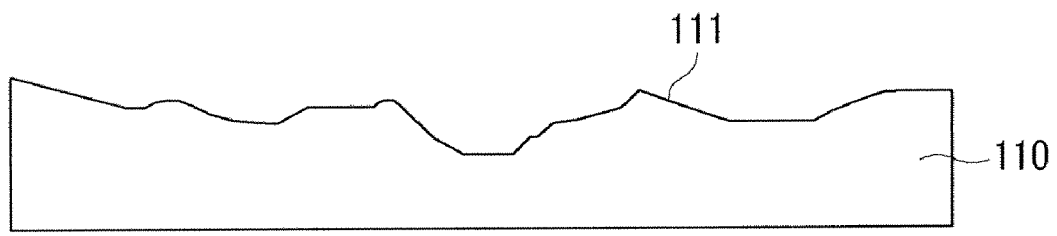
FIG. 5 is an enlarged view showing the micro-scale protrusions and depressions formed on the surface of the metal base in FIG. 3.
Figure 6:
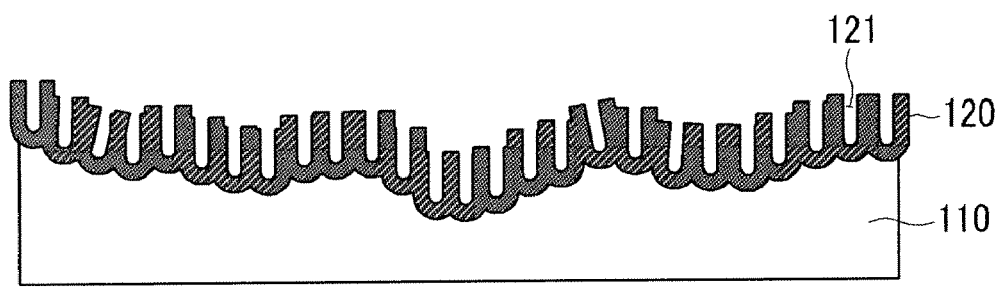
FIG. 6 is an enlarged view showing the formation of an anodized layer having nano-scale holes by anodizing the surface of the metal base in FIG. 5.

In this manner, the micro-scale protrusions and depressions 111 are formed on the outer surface of the metal base material 110, as shown in FIG. 5. Then, the anodized layer 120 is formed on the outer surface of the metal base 110 by anodizing, as shown in FIG. 6. Then, in addition to the micro-scale protrusions and depressions 111 formed on the metal base 110, nano-scale holes 121 having a diameter of a nano-scale, which is finer than the micro-scale protrusions and depressions 111, are formed on the anodized layer 120.

Figure 7:
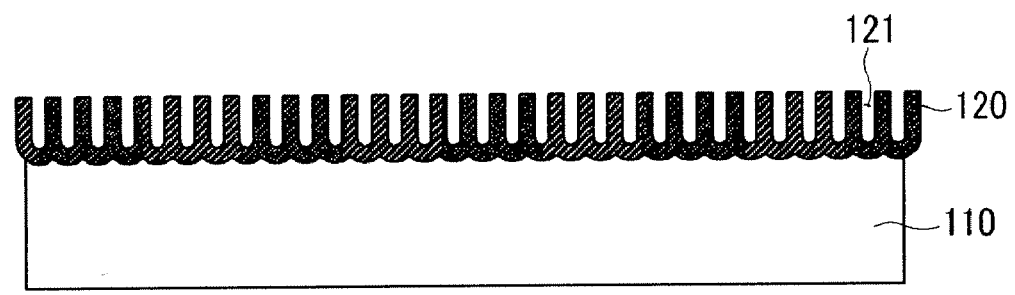
FIG. 7 is an enlarged view showing the formation of an anodized layer having nano-scale holes by anodizing the surface of the metal base in FIG. 2.

Alternatively, without spraying the particle, only anodizing may be performed in the exemplary embodiment of the present invention to form the anodized layer 120 on the outer surface of the metal base 110, as shown in FIG. 7.

Figure 8:
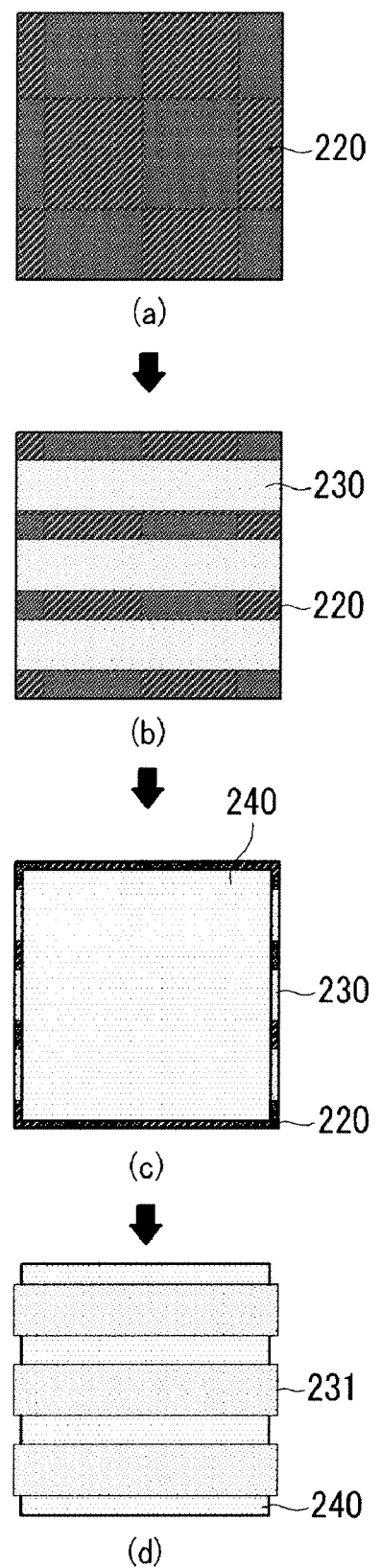
FIG. 8 shows plan views sequentially showing each step of the method for fabricating the membrane in FIG. 1.
Figure 9:
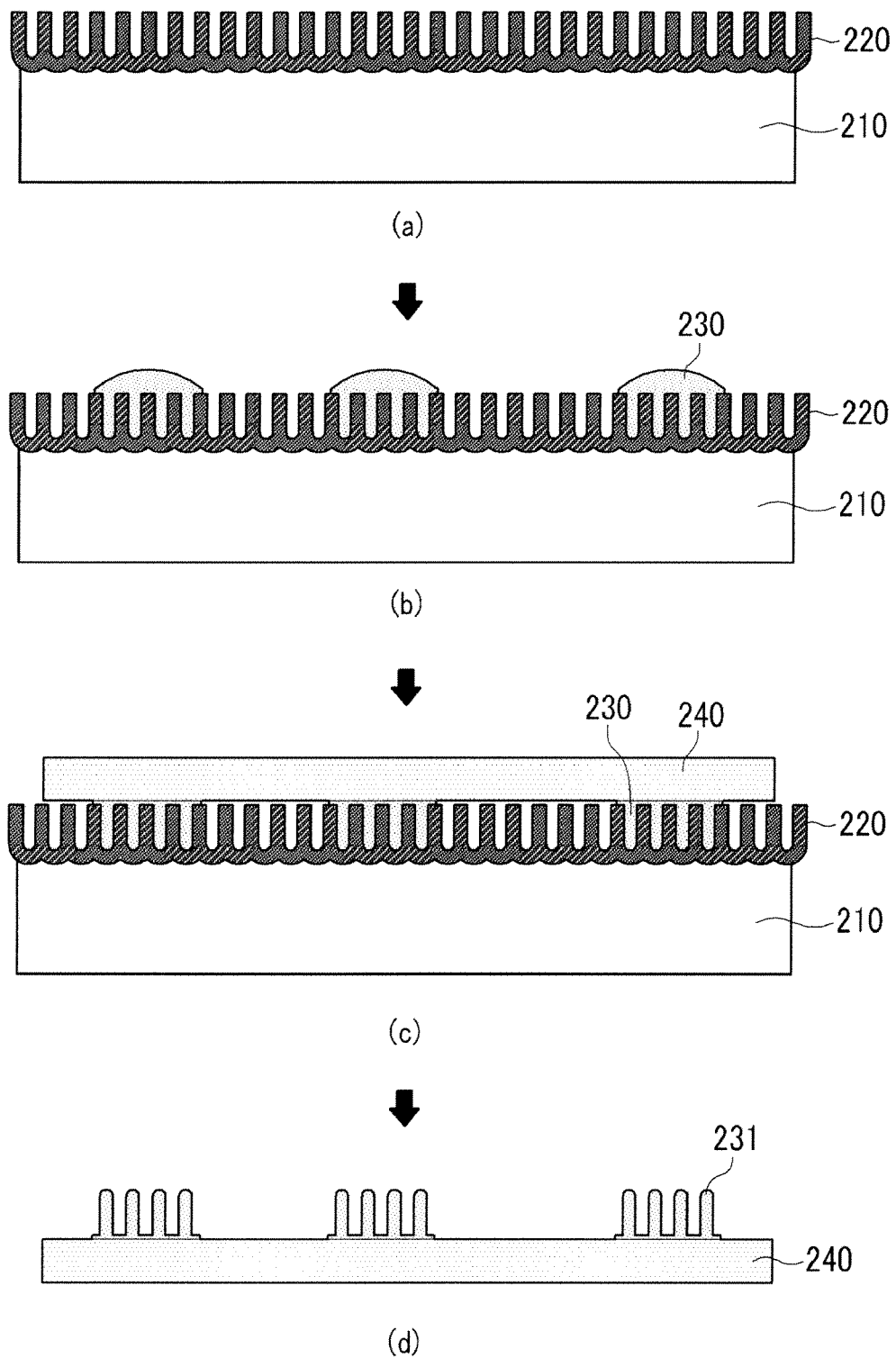
FIG. 9 shows sectional views sequentially showing each step of the method for fabricating the membrane in FIG. 1.

FIG. 8 shows plan views sequentially showing each step of the method for fabricating the membrane in FIG. 1, and FIG. 9 shows sectional views sequentially showing each step of the method for fabricating the membrane in FIG. 1.

As shown in FIGS. 1, 8, and 9, the metal template with the anodized layer 220 formed on the metal base 210 is prepared. Then, step S2 is performed to coat a polymer material 230 on the outer surface of the metal template. In the step S2, the polymer material 230 is coated such that it is completely injected into the nano-scale holes of the anodized layer 220 and then coagulated for a predetermined time period (referring to (b) of FIG. 8 or (b) of FIG. 9). Then, the polymer material 230 is formed as a negative replica structure corresponding to the nano-scale holes of the anodized layer 220, having such a shape of a plurality of pillars. In this case, in the step S2, the polymer material 230 may be coated only on a predetermined pattern region to form the negative replica structure in a certain pattern.

For example, the polymer material 230 may be coated according to the following three methods.

A first method is that a mask with a certain pattern is used and the polymer material 230 is coated only on a predetermined pattern of the mask. Namely, in the first method for coating the polymer material 230, first, the polymer material 230 such as a photoresist is spin-coated on the anodized layer 220. The property of the polymer material such as the photoresist changes when reacting with light of a particular wavelength. In the first method for coating the polymer material 230, the mask for blocking light is put on the spin-coated polymer material 230, on which light is then irradiated. The bonding force of the polymer material 230 slackens only at the region exposed to light, so the exposed region is removed through a process such as etching. In this manner, in the first method for coating the polymer material 230, the polymer material 230 can be coated only on the predetermined pattern region by using the mask.

A second method for coating the polymer material 230 is that the polymer material 230 is coated only on a pattern region desired to be set by using an injector that sprays the polymer material 230. Namely, in the second method for coating the polymer material 230, an injector such as a micro-extruder is used to spray the polymer material 230 with a thickness of a nano-scale or micro-scale. The injector may act along the pattern desired to be set according to a position control program, while spraying the polymer material with the predetermined thickness, to coat the polymer material 230 only on the pattern region desired to be set.

A third method for coating the polymer material 230 is that the polymer material is directly coated by the user's hand. Namely, in the third method, if the pattern shape does not need to be precisely formed, the polymer material 230 may be coated by hand.

In the exemplary embodiment of the present invention, after the polymer material 230 is coated, the hydrophilic film 240 is attached on the outer surface of the metal template (S3). Preferably, as the hydrophilic film 240, a material that has a small contact angle with a liquid and has an adhesive property allowing the polymer material 230 to be attached thereon is used.

Thereafter, in the exemplary embodiment of the present invention, the metal template is separately removed from the hydrophilic film 240 (S4).

In the step S4, the metal template may be etched so as to be separately removed from the hydrophilic film 240 with the polymer material 230 attached thereon. If the metal template is the metal base 210 made of the aluminum material, it can be etched by saturated mercury chloride, and the anodized layer 220 can be etched by a solution obtained by mixing chromic acid and phosphoric acid.

Further, the step S4 may be performed such that the hydrophilic film 240 with the polymer material 230 attached thereon may be directly pulled out to separate the metal template from the hydrophilic film 240 with the polymer material 230 attached thereon. In this case, before coating the polymer material 230, preferably, a release agent is coated on the anodized layer 220. Then, the polymer material 230 will not be damaged in the process of being separated from the anodized layer 220 of the metal template but may be easily separated in the state of being attached on the hydrophilic film 240.

The polymer material 230 attached on the hydrophilic film 240 is the negative replica structure corresponding to the nano-scale holes of the anodized layer 220, including pillars of a nano-scale. The region where nano-scale pillars 231 are formed is the hydrophobic surface with minimized non-wetting characteristics, on which the contact angle with a liquid may be drastically increased to more than 160°.

As described above, in the exemplary embodiment of the present invention, the nano-scale pillars 231 can be formed on the predetermined pattern region of the hydrophilic film 240, thus fabricating a membrane having both the hydrophobic surface as well as the hydrophilic surface.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for fabricating a membrane having a hydrophilic area and a hydrophobic area, the method comprising:
    preparing a template with nano-scale holes formed on an outer surface of the template;
    coating a polymer material on a part having a predetermined pattern of the outer surface of the template;
    attaching a hydrophilic film on the outer surface of the template; and
    removing the template from the hydrophilic film.

2. The method of claim 1, wherein the template comprises an anodized layer having nano-scale holes formed on an outer surface of a metal substrate by anodizing the metal substrate.

3. The method of claim 2, wherein the anodized layer of the template is formed after spraying micro-scale particles onto the surface of the metal substrate to form micro-scale protrusions and depressions.

4. The method of claim 1, wherein coating the polymer material comprises coating the polymer material on the outer surface of the template, positioning a mask of a predetermined pattern on the polymer material, and removing the polymer material at a part of the outer surface of the template other than a part of the outer surface of the template having the predetermined pattern.

5. The method of claim 4, comprising irradiating light to the polymer material to change a property of the polymer material at a part of the polymer that is not blocked by the mask, and the polymer material is etched to remove the polymer material at a part of the outer surface of the template other than the part of the outer surface of the template having the predetermined pattern.

6. The method of claim 1, wherein coating the polymer material comprises coating the polymer material on a part of the outer surface of the template having the predetermined pattern by operating an injector that sprays the polymer material with a predetermined thickness.

7. The method of claim 1, wherein the hydrophilic film has an adhesive property to allow the polymer material coated on the template to be attached to the hydrophilic area of the film.

8. The method of claim 1, wherein removing the template comprises removing the template through chemical etching.

9. The method of claim 1, wherein removing the template comprises separating the template from the hydrophilic film with the polymer material attached thereon such that the template and the hydrophilic area of the film are directly pulled out with an external force.

10. The method of claim 9, wherein a release agent is coated on the outer surface of the template.

* * * * *